(12) United States Patent
Hurst et al.

(10) Patent No.: US 8,914,151 B2
(45) Date of Patent: Dec. 16, 2014

(54) APPARATUS AND METHOD FOR LEGGED LOCOMOTION INTEGRATING PASSIVE DYNAMICS WITH ACTIVE FORCE CONTROL

(75) Inventors: Jonathan Hurst, Albany, OR (US); Devin Koepl, Vancouver, WA (US)

(73) Assignee: The State of Oregon Acting by and through the State Board of Higher Education on behalf of Oregon State University, Corvallis, OR (US)

( * ) Notice: Subject to any disclaimer, the term of this patent is extended or adjusted under 35 U.S.C. 154(b) by 180 days.

(21) Appl. No.: 13/542,204

(22) Filed: Jul. 5, 2012

(65) Prior Publication Data

US 2013/0013111 A1 Jan. 10, 2013

Related U.S. Application Data

(60) Provisional application No. 61/504,502, filed on Jul. 5, 2011.

(51) Int. Cl.
*G06N 3/00* (2006.01)
*B62D 57/02* (2006.01)
*B62D 57/032* (2006.01)

(52) U.S. Cl.
CPC .............. *B62D 57/032* (2013.01); *G06N 3/008* (2013.01); *B62D 57/02* (2013.01)
USPC .......................................... 700/250; 700/253

(58) Field of Classification Search
CPC ............ G06N 3/008; G05D 2201/0217; Y10S 901/01; B62D 57/032; B62D 57/02; B62D 57/024; F16F 9/06; A63H 11/00; H02K 41/00

USPC ......................... 700/250, 253, 254, 260, 261; 318/568.12; 901/1, 9

See application file for complete search history.

(56) References Cited

U.S. PATENT DOCUMENTS

| | | | |
|---|---|---|---|
| 5,650,704 A * | 7/1997 | Pratt et al. ..................... 318/623 |
| 6,243,624 B1 | 6/2001 | Wu et al. |
| 6,247,546 B1 * | 6/2001 | Spletzer et al. ................ 180/8.5 |
| 6,558,297 B1 * | 5/2003 | Brown et al. ................... 482/77 |
| 7,111,696 B2 * | 9/2006 | Miyazaki et al. .............. 180/8.5 |
| 7,263,955 B1 * | 9/2007 | Fischer ........................ 123/46 R |
| 7,270,589 B1 * | 9/2007 | Brown et al. ................. 446/317 |
| 7,503,410 B2 * | 3/2009 | Delson ........................... 180/7.1 |
| 7,775,305 B1 * | 8/2010 | Fischer ........................... 180/8.1 |
| 8,024,070 B2 * | 9/2011 | Sano et al. ..................... 700/254 |
| 8,387,726 B2 * | 3/2013 | Miyazaki ...................... 180/8.6 |
| 2004/0255711 A1 * | 12/2004 | Takenaka et al. .......... 74/490.01 |
| 2004/0261561 A1 * | 12/2004 | Takenaka et al. .......... 74/490.01 |
| 2006/0247800 A1 * | 11/2006 | Takenaka et al. ............... 700/54 |
| 2007/0150110 A1 * | 6/2007 | Delson .......................... 700/245 |

(Continued)

OTHER PUBLICATIONS

Robinson, D., et al., "Series Elastic Actuator Development for a Biomimetic Walking Robot", ASME Int'l Conf on Adv. Intelligent Mechatronics, Sep. 19-22, 1999.

(Continued)

*Primary Examiner* — Jason Holloway
(74) *Attorney, Agent, or Firm* — Niels Haun; Dann Dorfman Herrell & Skillman, PC

(57) ABSTRACT

A robot for legged locomotion incorporating passive dynamics with active force control and method are provided.

23 Claims, 13 Drawing Sheets

(56) References Cited

U.S. PATENT DOCUMENTS

| | | | |
|---|---|---|---|
| 2010/0324699 A1* | 12/2010 | Herr et al. | 623/27 |
| 2011/0015762 A1* | 1/2011 | Rifkin | 623/53 |
| 2011/0208322 A1* | 8/2011 | Rifkin et al. | 623/55 |

OTHER PUBLICATIONS

Pratt, J., et al., "Exploiting Natural Dynamics in the Control of a Planar Bipedal Walking Robot", Proceedings of the Thirty-Sixth Annual Allerton Conference on Communication, Control, and Computing, Monticello, Illinois, Sep. 1998.

Pratt, G., et al., "Series Elastic Actuators" in IEEE International Conference on Intelligent Robots and Systems, vol. 1, pp. 399-406, 1995.

Koepl, D., et al., "Force Control for Planar Spring-Mass Running" in Intelligent Robots and Systems (IROS), 2011 IEEE/RSJ International Conference Ligent Robots and Systems (IROS). 2011 IEEE/RSJ International Conference.

Koepl, D., et al., "Force Control for Spring-Mass Walking and Running" in Advanced Intelligent Mechatronics (AIM), 2010 IEEE/ASME International Conference on, Jul. 8, 2010.

"A View on Machine Vision", Packaging Magazine, Packaging, Techpages, p. 26-27, Jul. 2008.

Hubicki, C., "Adjustable-Compliance Legs. Why Bother?", 4 pages, Jun. 14, 2012.

Seyfarth, A., et al., "Swing-leg Retraction: A Simple Cotnrol Model for Stable Running", The Journal of Experimental Biology 206, 2547-2555, 2003, The Company of Biologists Ltd.

Seyfarth, A., et al., "Natural Control of Spring-Like Running: Optimised Selfstablisation" In CLAWAR, 2002.

Collins, S., et al., "Efficient Bipedal Robots Based on Passive-Dynamic Walkers", Feb. 18, 2005, vol. 307, Science, pp. 1082-1085.

Tello, E., Review of "Legged Robots that Balance" by M. Raibert, p. 89, 1986.

Raibert, M., et al., "BigDog, the Rough-Terrain Quadruped Robot", Proceedings of the 17th World Congress, The International Federation of Automatic Control, Seoul, Korea, Jul. 6-11, 2008, pp. 10822-10825.

McGuigan, M, et al., "The Effect of Gait and Digital Flexor Muscle Activation on Limb Compliance in the Forelimb of the Horse Equus Caballus", The Journal of Experimental Biology 206, pp. 1325-1336, 2003, The Company of Biologists Ltd.

Sreenath, K., et al., "A Compliant Hybrid Zero Dynamics Controller for Stable, Efficient and Fast Bipedal Walking on Mabel", Int. J. Rob. Res. 30, 1170 (Aug. 2011).

Kemper, K., et al., "Optimal Passive Dynamic for Torque/Force Control", International Conference on Robotics and Automation, Sep. 15, 2010, 6 pages.

Hurst, J., et al., "An Actuator with Physically Variable Stiffness for Highly Dynamic Legged Locomotion", International Conf. on Robotics and Automation, New Orleans, LA Apr. 26-May 1, 2004.

McGuigan, M., et al., "Horse's Leg Set to Spring", 'pogo stick' horse legs need better track surfaces, Journal of Experimental Biology, vol. 206, p. 1261, 2003.

Ferris, D., et al., "Interaction of Leg Stiffness and Surface Stiffness During Human Hopping", 1997 the American Physiological Society, pp. 15-22.

Farley, C., et al., "Mechanism of Leg Stiffness Adjustment for Hopping on Surfaces of Different Stiffness", American Physiological Society, pp. 1044-1055, 1998.

Cavagna, G., "Storage and utilization of elastic energy in skeletal muscle," Exercise Sports Science, vol. 5, pp. 89-129, 1977.

"Faster Processing, Faster Payback", Packaging Magazine, Techpages, p. 25, Jul. 2008.

Daley, M, et al., "Running over rough terrain: Guinea fowl maintain dynamic stability despite a large unexpected change in substrate height," The Journal of Experimental Biology, vol. 209, pp. 171-187, 2006.

Ernst et al. M, et al "Spring-legged locomotion on uneven ground: a control approach to keep the running speed constant" in Proc 12th Int Conf on Climbing and walking Robots (CLAWAR), 2009.

Blickhan, R., "The Spring-Mass Model for Running and Hopping," J. of Biomech., vol. 22, pp. 1217-1227, 1989.

Ahmadi, M, et al., "Controlled passive dynamic running experiments with the arl-monopod ii," IEEE Transactions on Robotics, vol. 22, pp. 974-986, Oct. 2006.

Ahmadi, M., et al., "A control strategy for stable passive running", in IEEE Conf. on Intelligent Systems and Robots, pp. 152-157,1995.

Collins, S., et al., "A Bipedal Walking Robot with Efficient and Human-Like Gait*", International Conference on Robotics and Automation, Barcelona, Spain, Apr. 2005, pp. 1983-1988.

Collins, S., et al., "A 3-d passive dynamic walking robot with two legs and knees," International Journal of Robotics Research, vol. 20, pp. 607-615, 2001.

Verrelst, B., et al., "Novel robotic applications using adaptable compliant actuation. an implementation towards reduction of energy consumption for legged robots," Mobile Robots, Moving Intelligence, pp. 513-534, Dec. 2006.

Geyer, H., et al., "Spring-mass running: Simple approximate solution and application to gait stability," Journal of Theoretical Biology, vol. 232, p. 315-328, 2005.

Grimes, J.A., et al., "The Design of Atrias 1.0 a Unique Monopod, Hopping Robot", Apr. 9, 2012, WSPC—Proceedings Trim Size: 9in x bin, pp. 1-7.

"Healthy Production Healthy Profit", Packaging Magazine, Packaging, Trends, p. 20-21, Jul. 2008.

* cited by examiner

CONSTANT ANGLE CoM AND TOE TRAJECTORIES (m)

EGB METHOD CoM AND TOE TRAJECTORIES (m)

ACTUATED MODEL CoM AND TOE TRAJECTORIES (m)

CONSTANT ANGLE CoM AND TOE TRAJECTORIES (m)

EGB METHOD CoM AND TOE TRAJECTORIES (m)

ACTUATED MODEL CoM AND TOE TRAJECTORIES (m)

APPARATUS AND METHOD FOR LEGGED LOCOMOTION INTEGRATING PASSIVE DYNAMICS WITH ACTIVE FORCE CONTROL

RELATED APPLICATIONS

This is Application claims the benefit of priority of U.S. Provisional Application No. 61/504,502, filed on Jul. 5, 2011, the entire contents of which application(s) are incorporated herein by reference.

GOVERNMENT LICENSE RIGHTS

This invention was made with government support under contract number W91CRB-11-1-0002 awarded by the Defense Advanced Research Projects Agency (DARPA). The government has certain rights in the invention.

FIELD OF THE INVENTION

The present invention relates generally to devices and methods for legged locomotion, such as robots for legged locomotion incorporating passive dynamics with active force control.

BACKGROUND OF THE INVENTION

Walking and running robots, in general, have significant ground to cover before they can approach the abilities of animals. Walking and running animals are able to attenuate significant disturbances, such as uneven ground, while maintaining excellent energy economy. Existing passive walkers, such as the Cornell Walker, are capable of energy economy similar to animals, but will fall in the presence of small disturbances. Robots that rely primarily on active control, such as Boston Dynamics' "BigDog," can demonstrate impressive robustness to disturbances at the expense of energy economy. In contrast, humans and animals make excellent use of passive dynamics, but also use active control to compensate for disturbances. For example, guinea fowl are able to accommodate a drop in ground height by rapidly extending their leg into an unexpected disturbance, resulting in only slight deviation from their undisturbed gait. Furthermore, biomechanics studies suggest that humans and animals adjust their leg stiffness during hopping, walking, and running to accommodate changes in ground stiffness and speed. These types of active responses to ground disturbances are important on physical systems, where deviations from the undisturbed gait can lead to a loss of stability, falls, or springs exceeding their maximum deflection, potentially causing damage. For instance, galloping horses are already near peak force on tendons and bones, so remaining below force limits is an important consideration, otherwise small ground disturbances could result in injury or damage. Spring-mass models consisting of a mass bouncing on a spring provide a good approximation for animal running However, while the simple spring-mass model is capable of some passive stability, without careful control of the leg angle at touchdown it tends to become unstable and fall.

A simple leg angle controller based on tuplets of natural frequency, zero-force leg length, apex hop height, and horizontal velocity may yield stable hopping gaits. Existing methods for selecting leg touchdown angles have included hand-tuned gain based controllers and constant leg retraction velocity control. (A. Seyfarth, H. Geyer, and H. Herr, "Swing-leg retraction: A simple control model for stable running," *The Journal of Experimental Biology*, vol. 206, pp. 2547-2555, 2003.) However, these methods require tuning, and are subject to controller optimality.

A more reliable method of selecting a leg touchdown angle for SLIP model running, presented by Ernst et al., prevents falls by ensuring a center of mass trajectory during stance that is symmetrical about midstance. (M. Ernst, H. Geyer, and R. Blickhan, "Spring-legged locomotion on uneven ground: A control approach to keep the running speed constant," in *Proceedings of the 12th International Conference on Climbing and Walking Robots (CLAWAR)*, 2009.). As used herein this type of gait will be referred to as an equilibrium gait, because every stride is the same as the last. In the interest of brevity, Ernst et al.'s method of selecting the leg touchdown angle will be referred to as the Ernst-Geyer-Blickhan (EGB) method.

Springs help running gaits by storing and releasing energy, but they are also useful for force control, which can improve the robustness of running gaits. The MIT Series Elastic Actuator (SEA) measures and controls the deflection of its spring, which corresponds to the force applied by the actuator. (G. A. Pratt and M. M. Williamson, "Series elastic actuators," in *IEEE International Conference on Intelligent Robots and Systems*, vol. 1, pp. 399-406, 1995.). As an added benefit, the series spring may filter impulsive forces, improving the SEA's robustness to shock loads. (D. W. Robinson, J. E. Pratt, D. J. Paluska, and G. A. Pratt, "Series elastic actuator development for a biomimetic walking robot," in *IEEE/ASME international conference on advanced intelligent mechatronics*, September 1999.). The performance of force-controlled actuators, such as the SEA, has been explored, and some task specific criteria for selecting actuator dynamics have been identified, but these investigations are not generally extended to robot walking and running (K. Kemper, D. Koepl, and J. Hurst, "Optimal passive dynamics for torque/force control," in International Conference of Robotics and Automation, 2010.). However, force control using the deflection of series springs has been successfully implemented on legged robots such as Boston Dynamics' walking and running quadruped, "BigDog", and the MIT Leg Lab's walking biped, "Spring Flamingo". (M. Buehler, R. Playter, and M. Raibert, "Robots step outside," in *International Symposium Adaptive Motion of Animals and Machines*, 2005. J. Pratt and G. Pratt, "Exploiting natural dynamics in the control of a planar bipedal walking robot," in *Proceedings of the Thirty-Sixth Annual Allerton Conference on Communication, Control, and Computing*, (Monticello, Ill.), September 1998.). These robots use springs in much the same way as the SEA, as a force sensor and mechanical filter, but not for energy storage. When correctly applied, this approach can result in impressive performance, but at the cost of high energy consumption.

Thus, there remains a need in the art to create robots that combine the robustness to disturbances of actively controlled machines with the energy economy of a passive dynamic walker.

SUMMARY OF THE INVENTION

In one of its aspects the present invention relates to devices and methods incorporating a control strategy for spring-mass running gaits which is robust to disturbances, while still utilizing the passive dynamic behavior of the mechanical model for energy economy. The strategy combines two ideas: a flight phase strategy, which commands a hip angle (and thus leg angle) trajectory prior to touchdown, and a stance phase strategy, which treats the spring-mass system as a force-controlled actuator and commands forces along a leg length direction according to an ideal model of the passive dynamics. This combined strategy is self-stable for changes in ground height or ground impedance, and thus does not require an accurate ground model. This strategy is promising for robotics applications, because there is a clear distinction between the passive dynamic behavior and the active controller, it does not require sensing of the environment, and it is based on a sound theoretical background that is compatible with existing high-level controllers.

For example, devices suitable for incorporation with the control strategy of the present invention may be represented by an actuated spring-mass model. The control strategy may work in conjunction with the model to utilize the passive dynamics for energy economy, and to add or remove energy only when necessary via actuation. Simulation demonstrates that the combined model and controller is energetically conservative like the completely passive spring-mass model during steady-state running, but is self-stable in the presence of disturbances in ground height or impedance. In other words, the model and controller of the present invention combine the benefits of passive dynamics and active control, producing an efficient and robust running gait.

A leg angle controller may be provided to maintain a symmetrical stance phase, where the velocity vector of the center of mass at liftoff is a perfect mirror of the velocity vector at touchdown; the horizontal component is identical, and the vertical component is equal and opposite. If there are no outside disturbances, a symmetrical stance phase leads to an equilibrium gait, because each stance phase is identical to the last. For a given spring-mass model, with a particular center-of-mass velocity vector at touchdown, there is a particular leg angle at touchdown that will result in a symmetrical stance phase. This leg angle may be calculated for each instant of time during the flight phase, as the velocity vector changes, such that the spring-mass model will have a symmetrical stance phase no matter when its foot makes contact with the ground.

While controlling the leg angle for a symmetrical stance phase may ensure an energetically optimal, stable gait on unpredictable, uneven terrain, changes in ground impedance, such as changes in ground stiffness or damping, will destabilize the gait. To handle such disturbances, stance phase force control is implemented in the present invention. Motors may control the deflection of the a spring as a function of time, and thus the toe force as a function of time, to match the ideal force profiles of the undisturbed passive spring-mass system. In the absence of disturbances the result is that the motor holds its position, and the spring does all the work. By maintaining a specific force profile, the leg appears to automatically adjust its stiffness to accommodate changes in ground stiffness, to adjust its zero force leg length to attenuate changes in ground surface height, and to add energy to accommodate changes in ground damping or any non-linear impedance.

For example, the present invention provides a robot for legged locomotion incorporating passive dynamics with active force control comprising at least one extendable leg and at least one leg motor coupled to a first end of the extendable leg and operable to extend and retract the leg along a leg length direction. At least one leg spring may be disposed in series with the at least one leg motor and at least one leg, where the leg spring is configured to store energy therein during a touchdown part of a stance and configured to recover the stored energy during a liftoff part of the stance to provide passive dynamic locomotion. In addition, a sensor may be provided to measure a force in the leg length direction proximate a second end of the at least one leg. A controller may also be provided in communication with the sensor and the at least one leg motor. The controller may be configured to detect a difference between the measured force profile and a force profile representing interaction of the at least one leg with a flat rigid surface, and may be configured to control the leg motor to extend or retract the leg to alter the force profile at the second leg end to substantially match the force profile representing interaction of the at least one leg with a flat rigid surface.

In addition, the present invention provides a method for controlling the force profile in the leg of a robot during stance to compensate for an unexpected ground disturbance. The method includes providing a robot having at least one extendable leg, at least one leg motor coupled to a first end of the extendable leg and operable to extend and retract the leg along a leg length direction, and at least one leg spring disposed in series with the at least one leg motor and at least one leg, where the leg spring is configured to store energy therein during a touchdown part of a stance and configured to recover the stored energy during a liftoff part of the stance to provide passive dynamic locomotion. The method may also include measuring a force in the leg length direction proximate a second end of the at least one leg, detecting a difference between the measured force profile and a force profile representing interaction of the at least one leg with a flat rigid surface, and commanding the leg motor to extend or retract the leg to alter the force profile at the second leg end to substantially match the force profile representing interaction of the at least one leg with a flat rigid surface.

BRIEF DESCRIPTION OF THE DRAWINGS

The foregoing summary and the following detailed description of the exemplary embodiments of the present invention may be further understood when read in conjunction with the appended drawings, in which.

DETAILED DESCRIPTION OF THE INVENTION

In one of its aspects, the present invention relates to devices and methods using force control and a specific force control profile that goes against the accepted wisdom. Much of the variable-stiffness community has been inspired by biomechanics studies showing that animals change their joint stiffness in many situations. The inventors have now discovered that many studies showing that animals change leg stiffness are misleading in their terminology, and have led most engineers down the wrong path. Indeed, the present disclosure demonstrates that the devices and methods of the present invention are able to reproduce the observed animal behaviors by using a force control method without changing physical leg stiffness at all. As initial proof of principles and benefits of the inventive devices and methods, a theoretical model and simulation are first presented.

Theoretical Model

Figure 1A:
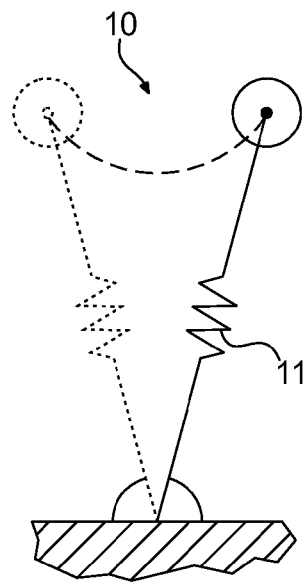
FIG. 1A schematically illustrates a passive spring loaded inverted pendulum (SLIP) model.
Figure 1B:
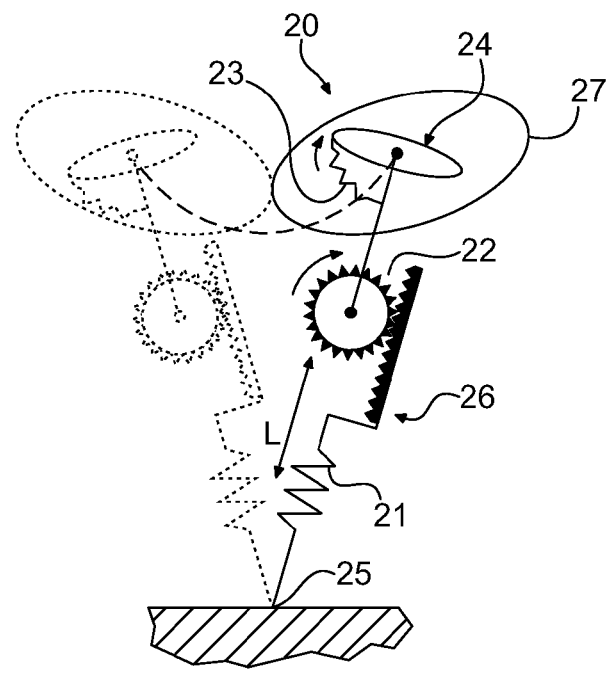
FIG. 1B schematically illustrates an exemplary actuated spring-mass model of an apparatus in accordance with the present invention.

Turning to a theoretical model of devices and methods of the present invention, the simple spring-mass model 10, a spring loaded inverted pendulum (SLIP) including spring 11, FIG. 1A, is augmented to represent exemplary devices in accordance with the present invention. Specifically, hip and leg actuation are added as well as a body 21 having moment of inertia to arrive at an exemplary realistic model 20 for robot running in accordance with the present invention, FIG. 1B.

The model 20 includes an extendable leg 26 with a leg motor 22 operably connected thereto to extend or retract the leg 26 along the leg length direction L. Leg mass is omitted from the model to keep the system as simple as possible, with the further goal that toe mass compose less than one percent of total mass of a device built in accordance with the model 20. The leg motor 22 makes use of the leg spring 21, while a second rotational spring 23 is included at a hip motor 24. The hip motor 24 may set the leg angle during flight and maintain zero moment about the hip during stance such that the force-controlled model 20 behaves like the passive model 10 during undisturbed hopping.

Kinetic equations of motion may be used to simulate the force-controlled model 20 hopping in the vertical plane. Although developing these non-linear equations is straightforward for both the standard spring-mass model 10 and the force-controlled model 20, finding a closed-form solution for the trajectories of either is impossible. However, approximate numerical solutions can be generated using ordinary differential equation solvers.

Control Strategy

Figure 2A:
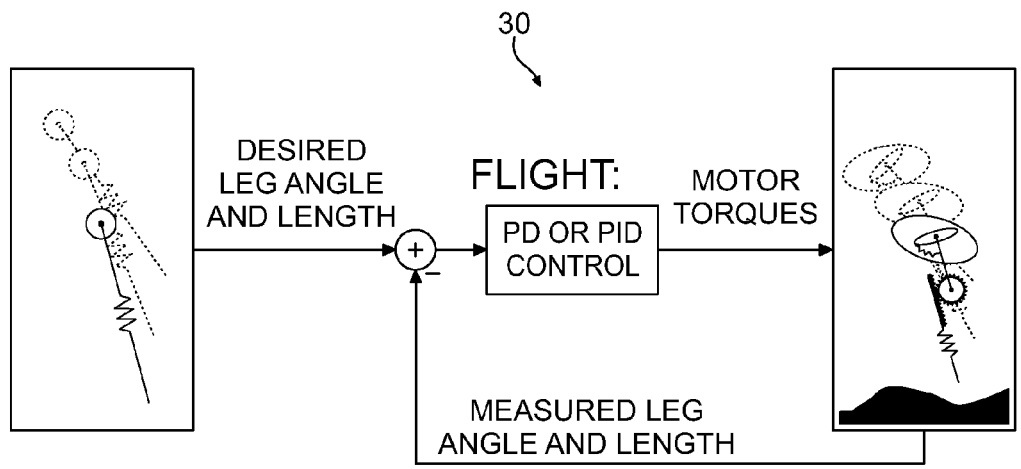
FIGS. 2A and 2B schematically illustrate exemplary flight and stance controllers, respectively, in accordance with the present invention in which controllers may be selected according to whether force is present in the model's springs.

In accordance with one aspect of the present invention, control of the model 20 seeks to match the force-controlled model's toe force profile to that of an equivalent undisturbed spring-mass model 10, such that the center of mass movement is roughly the same for both. During flight, a flight controller 30 may provide PD position control of the hip motor 24 and the EGB method used to set a leg angle trajectory, such that the model 20 touches down in an equilibrium gait regardless of when the toe 25 contacts the ground, FIG. 2A. Controlling the leg angle in this way requires a method for finding the equilibrium gait leg touchdown angle, but since the stance phase dynamics of the spring-mass model hopping with non-zero horizontal velocity in the vertical plane are non-integrable, analytically computing this equilibrium gait leg touchdown angle is not possible. This necessitates numerical solutions or analytical approximations such as those presented by Geyer et al. (H. Geyer, A. Seyfarth, and R. Blickhan, "Spring-mass running. Simple approximate solution and application to gait stability," *Journal of Theoretical Biology*, vol. 232, p. 315328, 2005.). A numerical solution for the SLIP model 10 along with a gradient descent algorithm may be used to generate a lookup table for the equilibrium gait leg angle, in much the same way as presented by Ernst et al., but here the zero-force leg length is also included as an input to the leg angle lookup table, since it varies in response to ground surface disturbances. For the purposes of this present simulation, a three input look up table was generated, but a trained neural network was also considered, and other approximations could yield similar results.

Figure 2B:
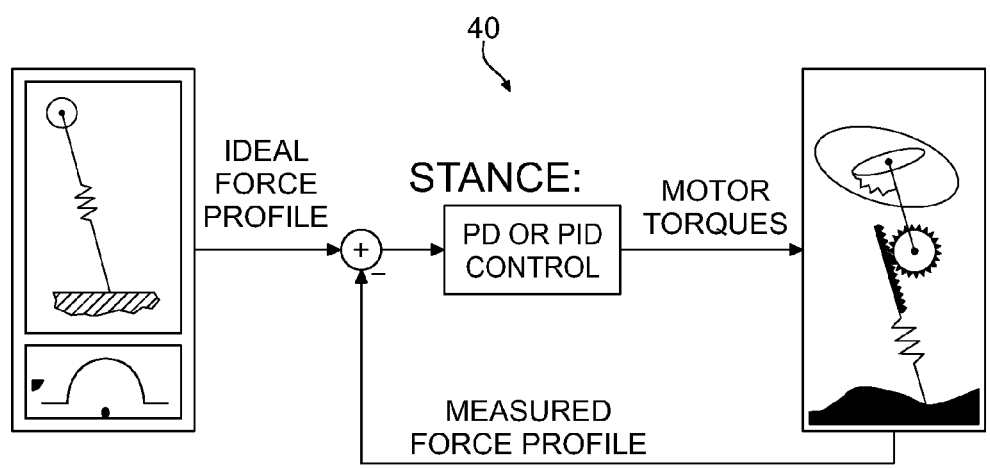

In stance, a stance controller 40 may provide PD torque control of the hip motor 24 may be used to approximate an ideal hinge, such that the force-controlled model 20 behaves like a SLIP model 10 in stance with a point mass body, FIG. 2B. (Though separately illustrated, the flight and stance controllers 30, 40 may be a single structure which switches between flight and stance control during operation.) The hip motor 24 should track the motion of the leg 26 in stance to maintain zero deflection of the hip spring 23; this task is equivalent to maintaining constant force against a moving load. Although optimal performance for a force control task would require very low motor inertia and spring stiffness, realistic values were supplied to the model in accordance with an exemplary device constructed in accordance with the present invention as described below in connection with FIG. 7. The limitations imposed by these realistic passive dynamics are represented in the results.

The leg motor 22 may attenuate ground disturbances by controlling the force in the leg spring 21 in response to the commands from stance controller 40. The leg spring stiffness may be tuned to the natural frequency of the desired spring-mass hopper, so energy will be stored in the spring 21 during the first part of stance, and then recovered as the body mass accelerates towards liftoff. In the ideal scenario, the leg motor 22 does no work, the hip motor 24 is only responsible for moving its own inertia and does no work on the environment, and all of the model's behavior is expressed by the passive dynamics of the system as it bounces forward. In the presence of disturbances, PD or PID force control provided by stance controller 40 of the leg motor 22 generates torques such that a toe force profile (and/or a toe impulse profile) can be followed provided that the leg motor's torque limits are not exceeded. As a result of attempting to control the leg force, if the toe 25 is not yet in contact with the ground when the robot expects to have made contact, the leg 26 may rapidly extend until it makes contact with the ground and the desired force applied.

The active control strategy maintains the passive dynamics of the equivalent spring-mass system 10, and intervenes with the passive dynamics of the simple model 20 only to accommodate ground disturbances. When the model 20 encounters an unexpected change in ground height or stiffness, the stance controller 40 may the activate leg motor 22 so the leg 26 extends or retracts such that the toe forces match those of the undisturbed passive dynamics During undisturbed hopping the simulation behaves like the simple spring-mass model 10 with minimal interference from the motors 22, 24. Aside from setting the leg touchdown angle, active control does work only when a ground disturbance is encountered.

Simulations

Three models were compared in simulation: a passive spring-mass model 10 with constant leg angle at touchdown, a spring-mass model that adjusts its leg angle in flight according to the EGB method, and the force-controlled model 20 according to the present invention that combines the EGB method with force control. The three models are subjected to changes in ground height and ground stiffness. To better demonstrate the feasibility of disturbance rejection on the force-controlled model 20 of the present invention in simulation, somewhat arbitrary, but realistic, values were chosen for a moderately-sized robot that had been constructed using a commercially available motor, such as the exemplary robot illustrated in FIG. 7 and further described below. The unactuated spring-mass models were not subjected to any of the physical limitations imposed on the force-controlled model. They were able to instantaneously set their leg angle, their hip behaved like an ideal hinge during stance, and they did not have motors that would hit their torque limit, accumulate angular momentum, or be backdriven. Ground disturbances were expected to result in permanent shifts in hopping phase and height for the standard spring-mass models, if not a loss of stability and falls. In contrast, the force-controlled model 20 according to the present invention was expected to accommodate ground disturbances and to closely follow the toe force profiles and center of mass trajectory of the undisturbed system.

Ground Height Disturbance

The first type of disturbance investigated was a decrease in ground height. There were no "sensors" that allow the model to change its control strategy or to forewarn the model of the change in ground height. After its first hop on the flat rigid surface, each model took its second hop onto the lower ground surface, and the ground surface then returned to its original height for a third hop. We chose a ground height disturbance of sufficient magnitude to cause the passive model 10 with constant leg touchdown angle to become unstable and fall.

Figure 3A:
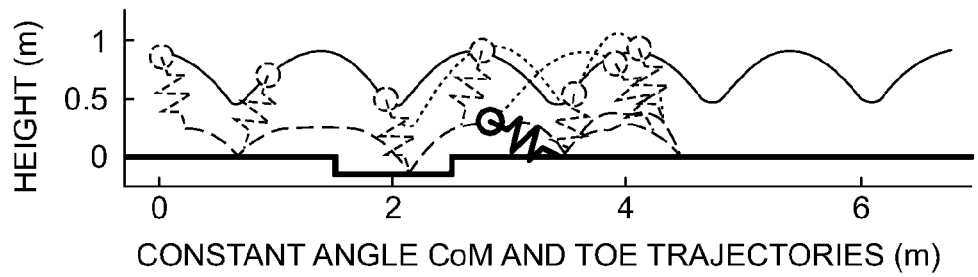
FIGS. 3A, 3B, and 3C schematically illustrate center of mass and toe trajectories for a passive spring-mass model, standard spring-mass model using the Ernst-Geyer-Blickhan (EGB) method, and a force-controlled model according to the present invention, respectively, upon encountering an unexpected decrease in ground surface height, in which the solid line represents the center of mass trajectory of the passive undisturbed model.
Figure 3B:
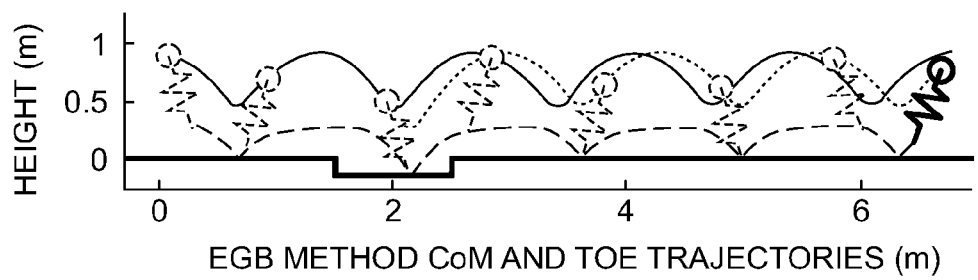
Figure 4:
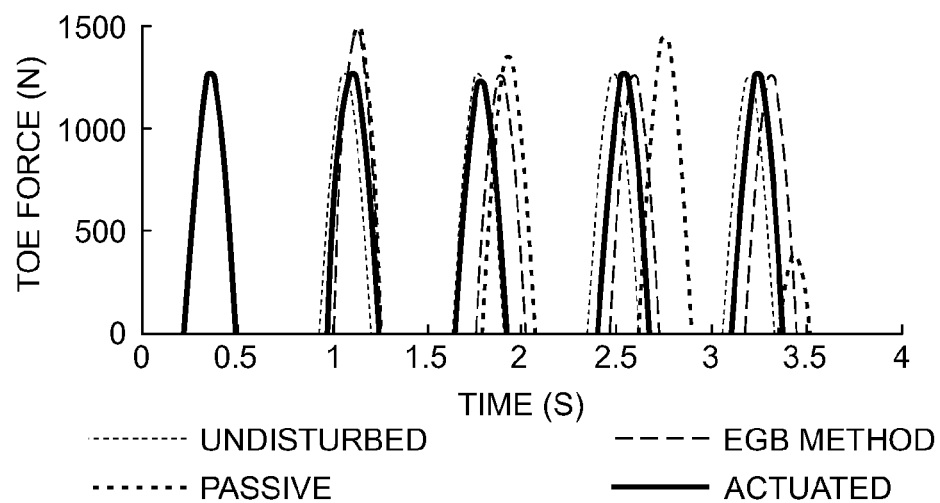
FIG. 4 schematically illustrates toe force profiles encountering a decrease in ground surface height for a passive undisturbed model, passive disturbed model, passive disturbed with Ernst-Geyer-Blickhan (EGB) leg touchdown angle model, and force-controlled model in accordance with the present invention, in which the force-controlled model is nearly able to maintain the toe force profile of the undisturbed model and is able to limit the peak forces, and in which, by contrast, both passive disturbed models show a significant change in the force profile and an increase in peak forces.

For the standard spring-mass models, variations in ground height affected the toe force profile and center of mass trajectory, as shown in FIGS. 3A, 3B, and 4. When these models encounter a drop in ground height, they touchdown with greater velocity and the toe force profile exceeds that of the undisturbed model. The spring-mass model with constant leg touchdown angle becomes unstable, and falls soon after the disturbance, as shown in FIG. 3A, because the ground height disturbance causes the model 10 with constant leg touchdown angle to lose horizontal velocity, making its leg touchdown angle too shallow. The spring-mass model using the EGB method hops through the disturbance without losing stability and maintains a constant horizontal velocity; however, although the EGB model does not fall, its center of mass trajectory is affected by the disturbance, FIG. 3B.

Figure 3C:
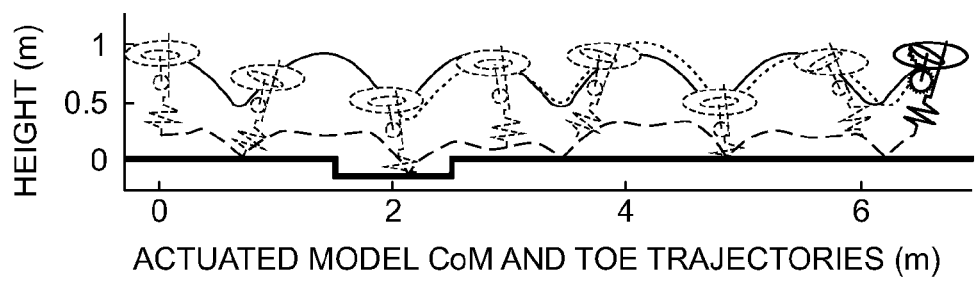

In contrast to the passive spring-mass models, FIGS. 3A, 3B, the toe force profile of the force-controlled model 20 according to the present invention is roughly maintained despite unexpected changes in ground height, such that the peak force does not increase from the undisturbed gait, FIGS. 3C, 4. The controller 40 instructs the leg motor 22 to extend the leg 26 as quickly as possible, given the leg motor torque limit, at the time of expected toe impact. When toe impact occurs, the leg motor 22 begins to track the force profile of the equivalent passive system hopping on flat rigid ground. The result is a small phase shift in the center of mass trajectory and toe force profile, as shown in FIG. 4, that is caused by the leg motor torque limit and inertia. These physical limitations and the lack of sensing of the environment make some deviation inevitable, but the deviation can be greatly reduced using the approach of the present invention.

Ground Stiffness Disturbance

The second type of ground disturbance investigated was an unexpected decrease in ground stiffness. For this experiment, the ground unexpectedly changed from being perfectly rigid to behaving like an ideal spring in all directions. As the models touched down, the ground depressed proportionately to the model's toe force. The net result was that the models experienced a leg spring stiffness equal to the series combination of its leg spring with the ground spring, and the hip stiffness was similarly affected.

Figure 5:
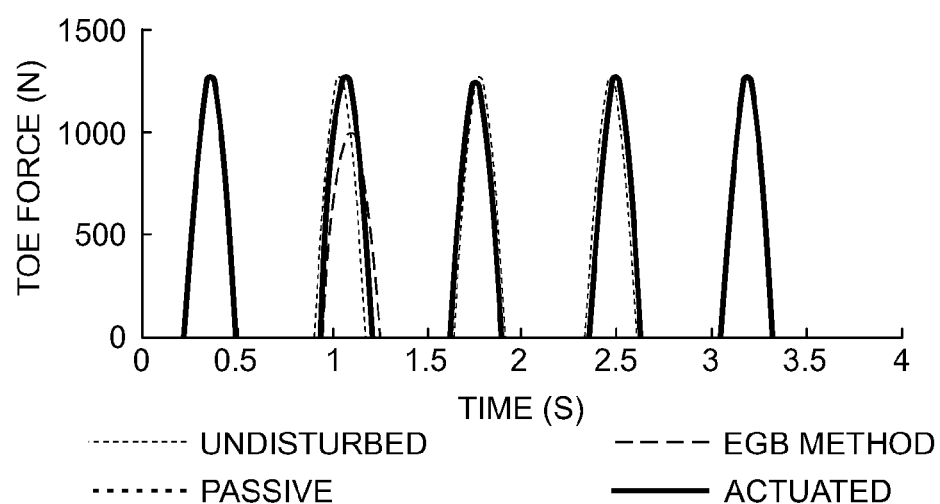
FIG. 5 schematically illustrates toe force profiles encountering a decrease in ground stiffness for a passive undisturbed model, passive disturbed model, passive disturbed with Ernst-Geyer-Blickhan (EGB) leg touchdown angle model, and force-controlled model in accordance with the present invention, in which the toe force profiles of the passive models encountering the disturbance deviate away from the toe force profile of the force-controlled model which is able to maintain the toe force profile of the undisturbed passive model, aside from a small phase shift caused by motor limitations.
Figure 6A:
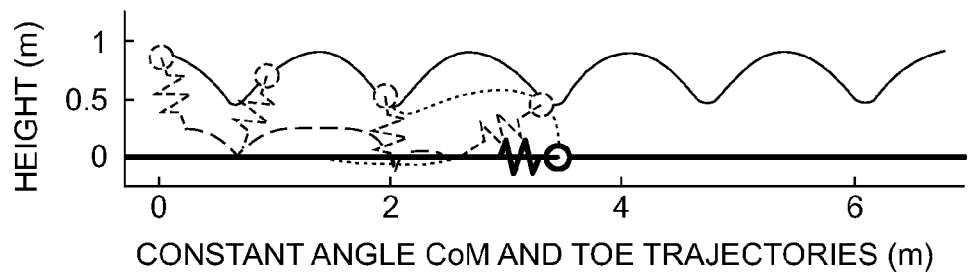
FIGS. 6A, 6B, and 6C schematically illustrate center of mass trajectory simulation results for a spring-mass model, Ernst-Geyer-Blickhan (EGB) model, and force-controlled model in accordance with the present invention, respectively, upon encountering an unexpected decrease in ground stiffness, in which the solid line represents the center of mass trajectory of the passive undisturbed model.
Figure 6B:
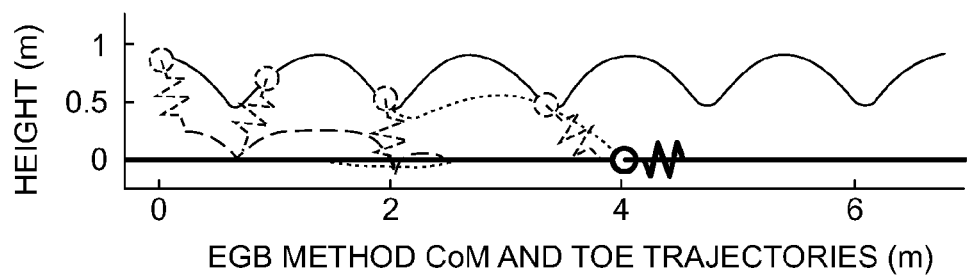

For the standard spring-mass models, variations in ground stiffness lead to immediate falls or, at best, a large change in center of mass trajectory and toe force profile, as shown in FIGS. 6A, 6B, and 5. When these models touchdown on a non-rigid surface, their apparent leg stiffness becomes the series combination of their leg spring and the ground stiffness, and their leg touchdown angle, which would have produced an equilibrium gait on rigid ground, is too steep for the decrease in stiffness. Even for small decreases in ground stiffness, the standard spring-mass model 10 with constant leg touchdown angle becomes unstable and falls, FIG. 6A. The standard spring-mass model with EGB leg touchdown angle can avoid falls due to ground stiffness perturbations by adjusting its leg touchdown angle to compensate for the higher horizontal velocity and lower hopping height that result from the disturbance, FIG. 6B. However, the EGB method will fail if a disturbance is severe enough that liftoff does not occur or an equilibrium gait touchdown angle cannot be found; that is, the EGB model may bounce out of the disturbance at such a low trajectory that there is no leg touchdown angle that will prevent a fall.

Figure 6C:
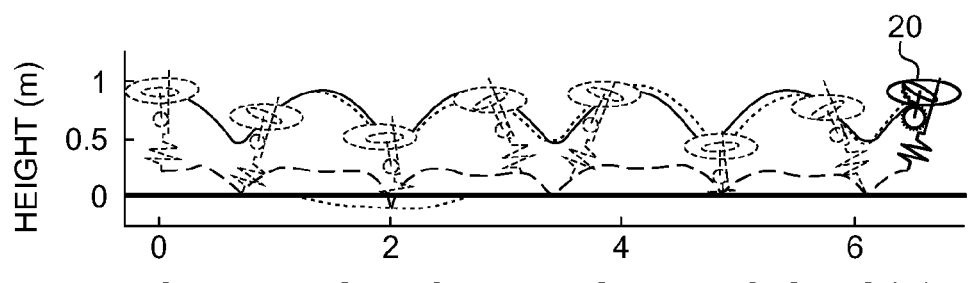

In contrast, the force-controlled model 20 according to the present invention substantially maintains the toe force profile of the equivalent undisturbed spring-mass model 10 despite changes in ground stiffness. The stance controller 40 controls the toe force profile by signaling the leg motor 22 to maintain a spring deflection which corresponds to the desired force, such that the toe force profile and apparent leg stiffness are roughly the same as for the undisturbed model hopping on flat rigid ground. As a result, the leg 26 may extend into the soft ground during the first half of stance and retract during the second half, FIG. 6C. As with the ground height disturbance, there is a slight deviation away from the undisturbed center of mass trajectory that results from motor limitations. This is because at the instant of touchdown, infinite motor torque is required to instantaneously give the leg motor 26 the angular velocity necessary to perfectly match the toe force profile of the undisturbed system, but the motor torque is limited to that of a commercially available motor.

By these simulations of a force-controlled model 20 in accordance with the present invention, good disturbance rejection has been shown for active force control (e.g., via stance controller 40) combined with careful control of the leg touchdown angle (e.g., via flight controller 30) for spring-mass model running, while requiring little sensory feedback and minimal active control. An untethered robot using such control strategy would require only joint position sensors, and an inertial measurement unit for sensing the center of mass velocity during flight. During steady state hopping, the model 20 predominantly relies on its passive dynamics as it hops forward, maintaining much of the energy economy of the entirely passive system. In the presence of disturbances, active motor control via controller 40 is used to approximate the toe force profile of the passive spring-mass model 10 on a flat rigid surface. The deviation that exists is due to motor limitations, and diminishes with greater control authority. Because the toe force profiles are close, the model's center of mass movement follows that of the undisturbed ideal passive system.

The above results also demonstrate that the control strategy provided by the controllers 30, 40 in accordance with the present invention can make the spring-mass model 20, hopping in the vertical plane, robust to ground disturbances with limited sensory input. The self-stability strategy of the present invention is based only on the spring deflections, center of mass velocity, motor, and body angles, and not on any external sensing, which makes it practical for legged robots that have incomplete knowledge of the world. While the passive dynamics of the system attenuate very high frequency disturbances, the force controller 40 focuses on the middle-frequency disturbances, leaving any high-level gait choices or stride-to-stride control to a higher-level control system. This novel concept of combining force control and a spring-mass model 20 is convenient, easy to implement on a real system with dynamic and sensing limitations, and effective. However, some system limitations caused by the motors' torque limit and inertia are also demonstrated.

When the force-controlled model 20 encounters a drop in ground height, there is a delay between when toe touchdown is expected to occur, and when it actually does. The delay depends on the magnitude of the disturbance and motor limitations. During this delay, the hip motor 24 gains angular momentum, causing a slight asymmetry in the stance of the force-controlled model 20. The simulated motor has a realistic inertia that can only be accelerated and decelerated as quickly as the motor's torque limit allows. The error in the toe force profile can be minimized by tuning control constants, but the controllers 30, 40 do not know the position of the ground or any other information about the world, so we presume that it may not be eliminated without additional sensory input. Despite this sensor limitation, the force controlled model 20 outperforms the idealized un-implementable SLIP model using the EGB method to set its leg touchdown angle and is able to perform well, with only a small discrepancy between the actual and desired toe force profiles, even in the presence of a substantial change in ground height.

Sensory and physical limitations affect the ability of the model 20 to remain in an equilibrium gait. The performance of the in-flight leg touchdown angle controller 30 is dependent on the accuracy of force and angle measurements during stance, the accuracy of the approximation method, the angular momentum of the leg motor 26 at touchdown, and the control authority of the hip motor 24. On a physical system with sensory, computing, and physical limitations, this dependency is unavoidable, and while such limitations could easily be lifted from the simulation, they were included to better illustrate the feasibility of the force control approach of the present invention in a physical system.

EXAMPLE

Figure 7:
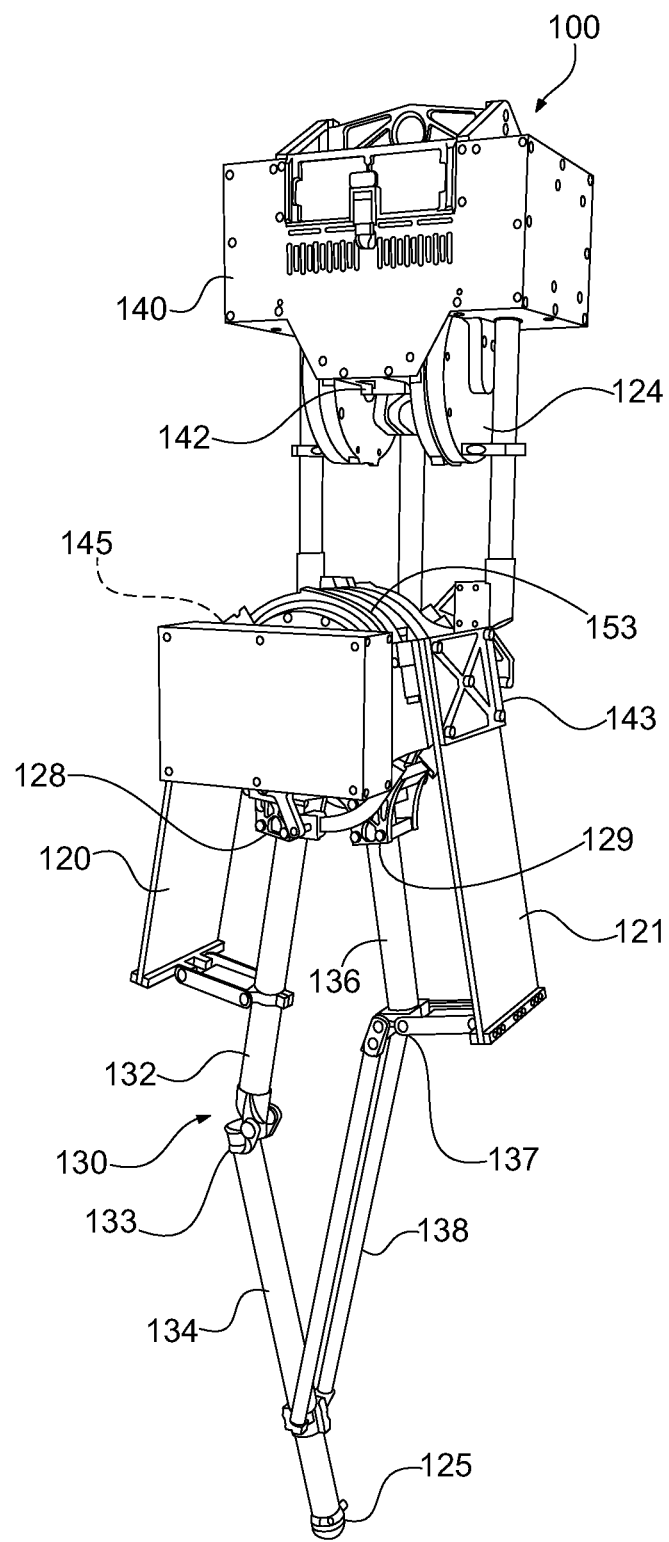
FIG. 7 schematically illustrates an exemplary monopod robot for legged locomotion built in accordance with the force-controlled model of the present invention.

Based on the principles embodied in the force-controlled model 20 and favorable results evidenced in the simulations, a robot 100 for legged locomotion was constructed in the form of a monopod which closely matched a spring-mass model, with actuation to overcome inevitable energy losses and model mismatches, FIG. 7. The leg 130 was provided in the form of a four-bar linkage comprising an posterior thigh segment 132 and posterior shin segment 134 pivotally joined at an posterior knee joint 133 along with a anterior shin segment 136 and a anterior thigh segment 138 pivotally joined at a anterior knee joint 137. The anterior thigh segment 138 was pivotally attached to the posterior shin segment 134 intermediate the posterior knee joint 133 and toe 125 of the posterior shin segment 134. The upper ends of each of the leg segments 132, 136 were pivotally mounted to a motor housing 206 via respective free pivot bearings 128, 129.

To minimize energy loss on ground impact (and to minimize impulses that can damage the robot 100 or destabilize the gait), the leg 130 was constructed to minimize the unsprung mass to approximate the massless leg of the force-controlled model 20. Specifically, the leg segments 132, 134, 136, 138 were constructed from filament-wound carbon fiber tubes (carbon tube #30065, Rock West Composites, West Jordan, Utah).

Figure 9:
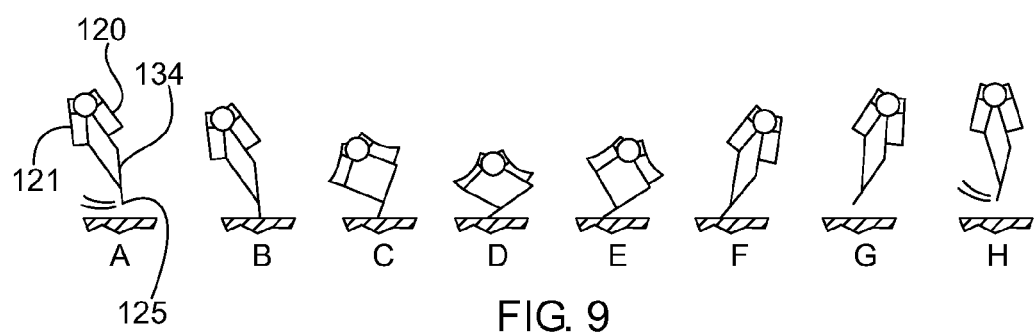
FIG. 9 schematically illustrates the hopping gait of the robot of FIG. 7.

The robot 100 incorporated leg springs 120, 121 designed for energy storage and performance and tuned to the gait of the robot 100. The spring size was selected such that the springs 120, 121 stored all the energy of the hopping gait, FIG. 9. One end of thigh leg spring 120 was pivotally mounted to the posterior thigh segment 132 intermediate the two ends of the posterior thigh segment 132, while one end of the shin spring 121 was pivotally mounted to the anterior shin segment 136 proximate the anterior knee joint 137. The leg springs 120, 121 were provided in the form of fiberglass plate springs 0.4 inches thick, 4 inches wide, and 18 inches long using GC-67-UB Bar stock (Gordon Composites, Inc., Montrose, Colo.).

Figures 14A, 14B:
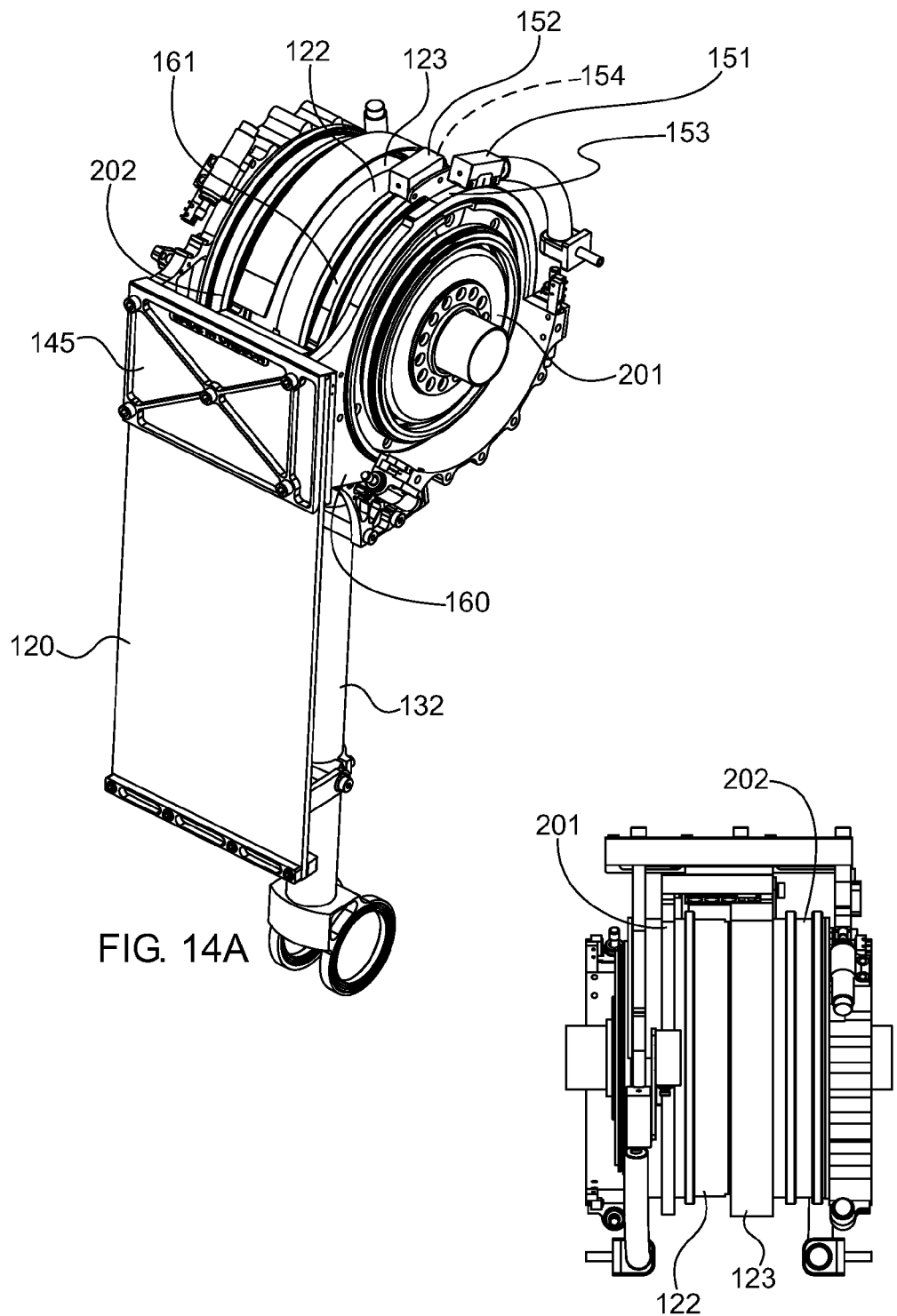
FIGS. 14A and 14B schematically illustrate isometric and side elevations view, respectively, of the leg motors and harmonic drives contained in the robot of FIG. 7.

First and second rotary leg motors 122, 123 (Emoteq Megaflux MF01050. Allied Motion, Amherst, N.Y.) were provided at a location above the leg 130 so that the mass of the motors 122, 123 was not placed on the leg segments 132, 134, 136, 138 themselves, and so that the mass of the motors 122, 123 was located near the center of the hip, as in the spring-mass model 20, FIGS. 14A, 14B. The leg motors 122, 123 were mounted to a proximal end of respective leg springs 120, 121 using respective spring clamps 143, 145. In one configuration, harmonic drive units 201, 202 were used to couple to the output of the leg motors 122, 123 to the leg springs 120, 121. (CSD50. Harmonic Drive LLC, Hauppauge, N.Y.). In an alternative configuration, a novel compound epicyclic cable drive 200 was used, FIGS. 12A-12D, 13.

The cable drive 200 included a "sun" pulley A driven by leg motor 122, FIGS. 12A-12D. The pulley A was coupled to pulley B via a cable transmission 202 wound therebetween in a figure-eight such that rotational energy applied to pulley A was transferred to pulley B. Pulleys B and C were connected as one piece, and pulley C was connected via cable transmission 204 in a figure-eight to pulley D, which in turn was formed as part of motor housing 206. As the motor shaft rotated pulley A, pulley B/C would roll around the outside of pulley D, and thus the motor housing 206, FIGS. 12C, 12D. An overall transmission ratio of 20:1 was achieved. The pulley B/C was mounted in a carriage 208 which included spring clamp 143, FIG. 13. Thus, as pulley B/C rolled around the motor housing 206, the carriage 208 rotated about the motor housing 206 as well, directly driving the leg spring 121, which was connected to the anterior leg segments 136, 138. A similar arrangement of motor and drive transmission was applied to the posterior leg spring 120 and posterior leg segments 132, 134.

Figure 10A:
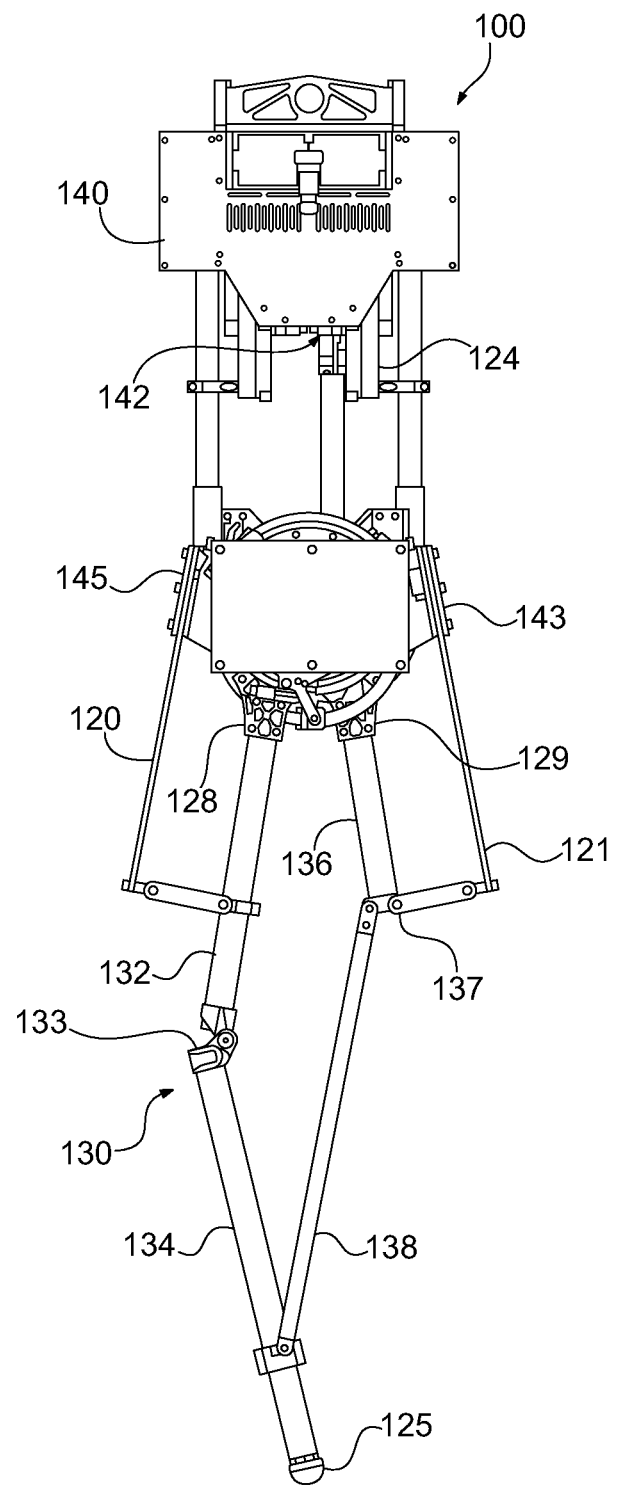
FIGS. 10A and 10B schematically illustrate the robot of FIG. 7 with leg position in an extended state with neutral leg springs and a leg position in a relatively retracted state with flexed leg springs, respectively, where leg retraction and extension and/or spring deflection is effected by counter-rotation of the leg motors.
Figure 10B:
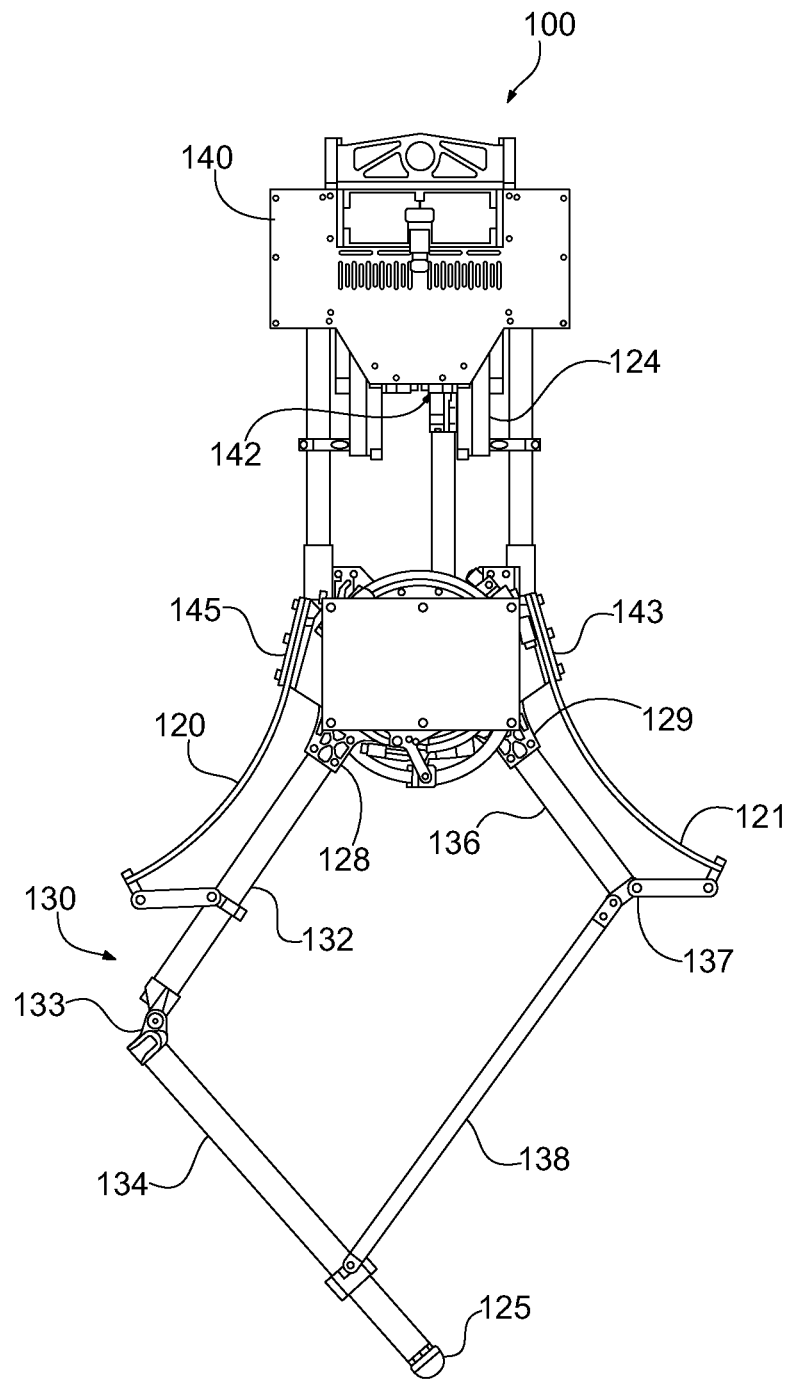

Thus, the leg springs 120, 121 were conveniently placed in series with respective leg segments 132, 136 and respective leg motors 122, 123, such that when the motors 122, 123 applied a torque, the torque was applied to the proximal end of the respective leg spring 120, 121 via the drives 200, 201. The applied torque was transmitted through the leg spring 120, 121 to effect movement of the corresponding leg segment 132, 136. However, during hopping on undisturbed ground (i.e., a flat rigid surface), the motors 122, 123 did not necessarily move at all; rather, the relatively massless leg 130 accelerated almost instantaneously and the springs 120, 121 began deflecting gradually to increase the force they transferred to the motors 122, 123, FIG. 10B.

Figure 8:
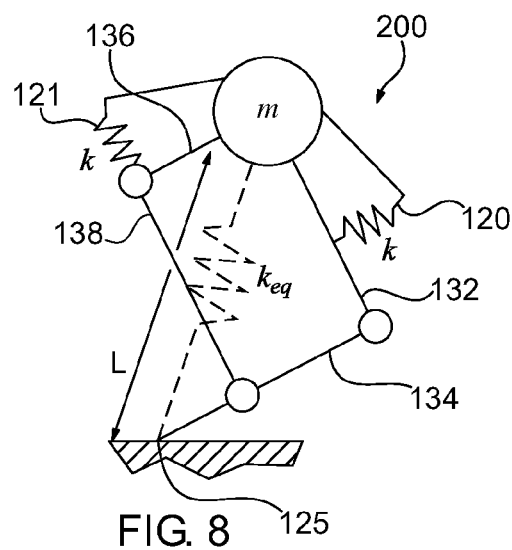
FIG. 8 schematically illustrates an actuated spring-mass model of the robot of FIG. 7.
Figure 11A:
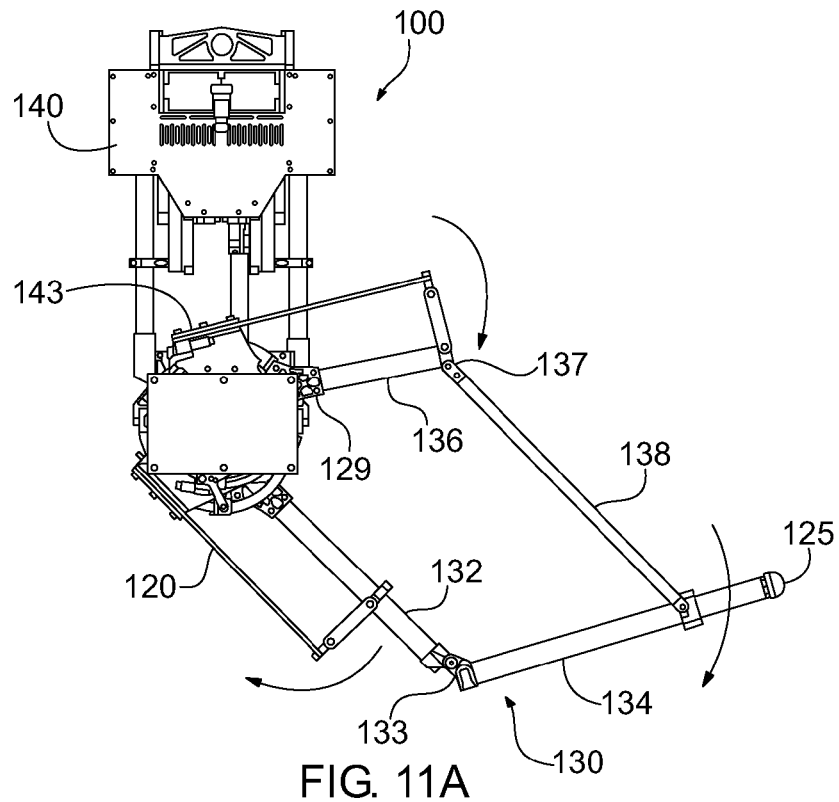
FIGS. 11A and 11B schematically illustrate leg swing of the robot of FIG. 7 effected by co-rotation of the leg motors.
Figure 11B:
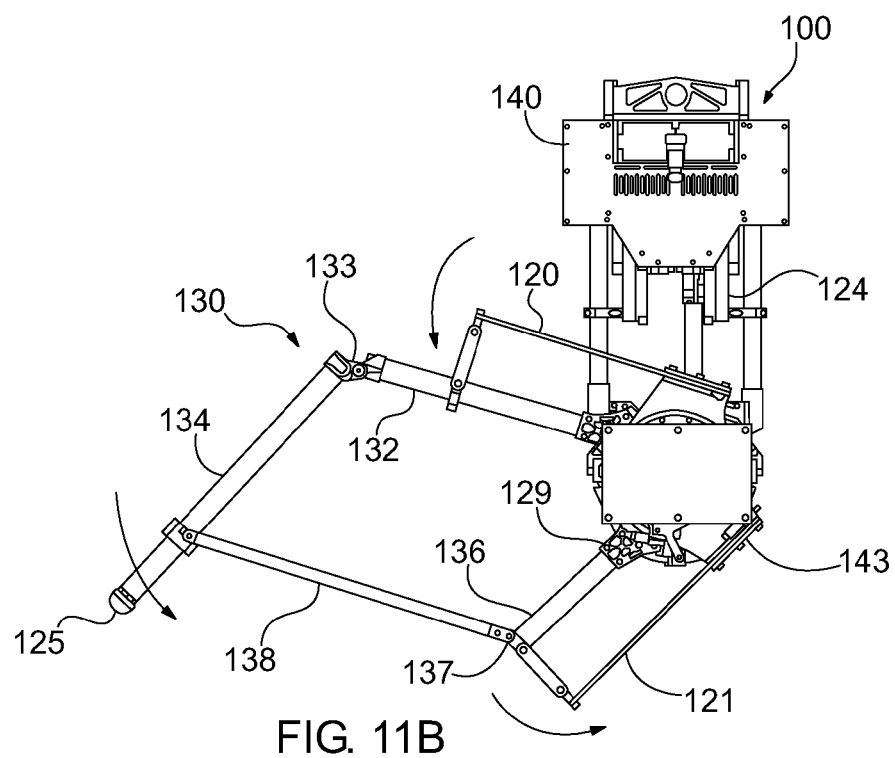
Figure 12A:
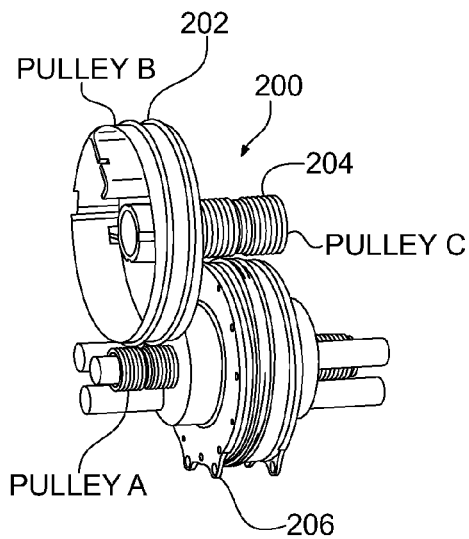
FIGS. 12A, 12B, 12C, and 12D schematically illustrate isometric, side, and opposing end views, respectively, of a compound epicyclic cable drive in accordance with the present invention.
Figure 12B:
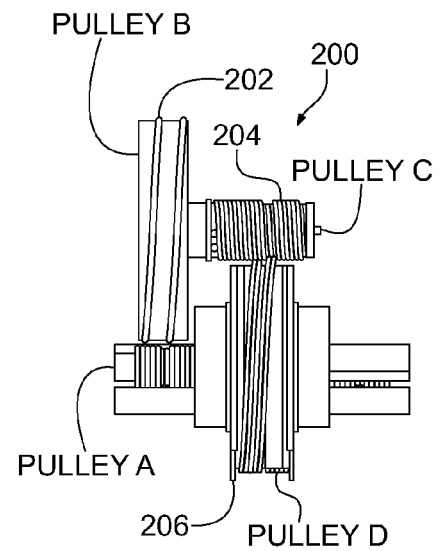
Figure 12C:
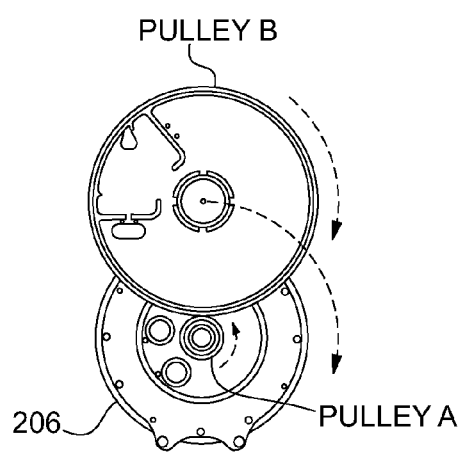
Figure 12D:
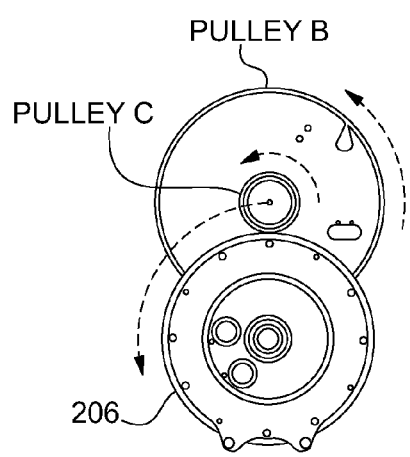
Figure 13:
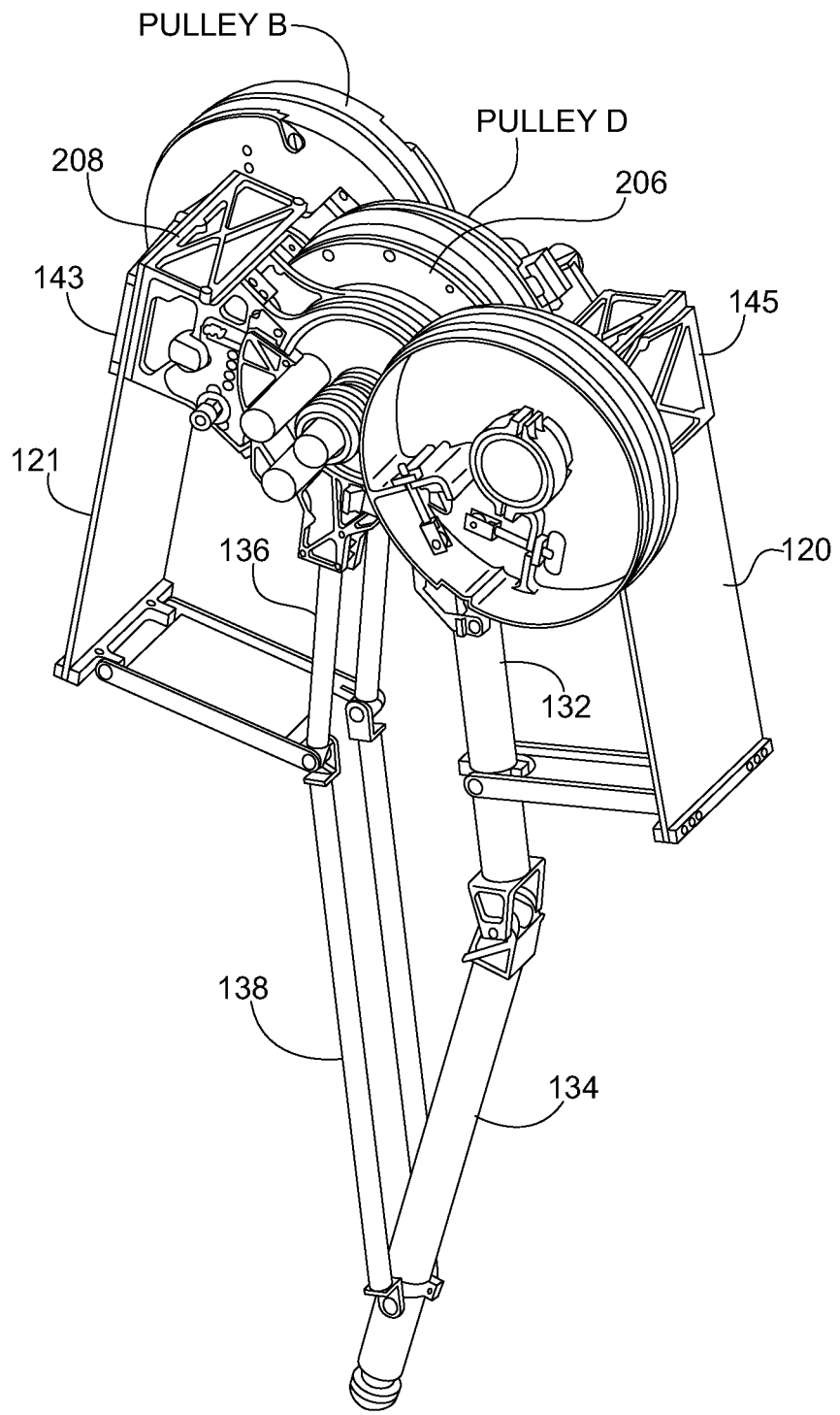
FIG. 13 schematically illustrates the compound epicyclic cable drive of FIGS. 12A-12C mounted to a four-bar leg assembly with leg springs mounted in series therebetween.

For applying forces in the leg length direction L (the leg length direction is defined as being along the line extending between the center of mass, m, and the toe 125, FIG. 8), the four-bar linkage allowed both motors 122, 123 to apply torques, meaning that all motors 122, 123 were engaged in applying ground reaction forces, rather than a single hip motor acting as deadweight while a single leg-length motor did all the work to lift the robot off the ground. Furthermore when extending the leg 130 quickly, both motors 122, 123 counter-rotated, thus canceling any inertial effects on the body of the robot 100, FIG. 10A. Conversely, leg swing was accomplished by co-rotation of the leg motors 122, 123, FIGS. 11A, 11B.

Precise proprioceptive sensing was an important consideration in the design of the robot 100. High-resolution sensors allowed for very good velocity measurements, which is a significant limitation for many highly dynamic machines. Renishaw "Resolute" absolute optical encoder sensors 151, 152, (Renishaw Inc., Hoffman Estates, Ill.) were used, with a linear tape scale 153, 154 that was attached in a partial arc to mounting plates 160, 161 of the proximal end of leg spring 120 and upper end of the posterior thigh segment 132, respectively, FIG. 14A. An additional pair of sensors and mounting plates were provided for leg shin spring 121 and anterior shin leg segment 136. Thus, both the deflection of the leg spring 120, 121, which corresponded to the applied force, and the configuration of the leg 130 could be measured. The sensors 151, 152 provided a 32-bit position value, which was significantly higher than most robot sensors.

A hip motor 124 was mounted above the motor housing and fitted with a cable pulley 142 to drive the leg 130 laterally, giving the ability to side-step. A controller for receiving signals from the sensors 151, 152, 153, 154 and sending control signals to the motors 122, 123, 124 was mounted in a casing 140. The controller was configured to detect a difference between a measured force profile, determined from the sensor data, and a force profile representing interaction of the leg 130 with a flat rigid surface. The controller then commanded the leg motors 122, 123 to extend or retract the leg 130 to alter the force profile at the toe 125 to substantially match a force profile representing interaction of the leg 130 with a flat rigid surface.

These and other advantages of the present invention will be apparent to those skilled in the art from the foregoing specification. For example, the devices and methods of the present invention may be employed to create a bio-inspired tether-free biped capable of robust walking and running gaits, which may maintain as much of the energy economy of the equivalent passive system as possible by making excellent use of its passive dynamics, while limiting the need for sensory feedback and active control. In addition, adding force control to the spring-mass model may benefit physical systems, such as a single degree of freedom benchtop actuator and a two degree of freedom monopod, for instance. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

All patents, patent applications, and publications mentioned herein are hereby incorporated by reference in their entireties to an extent not inconsistent with the above disclosure.

What is claimed is:

1. A robot for legged locomotion incorporating passive dynamics with active force control, comprising:
    at least one extendable leg;
    at least one leg motor coupled to a first end of the extendable leg and operable to extend and retract the leg along a leg length direction;
    at least one leg spring disposed in series with the at least one leg motor and at least one leg, the leg spring configured to store energy therein during a touchdown part of a stance and configured to recover the stored energy during a liftoff part of the stance to provide passive dynamic locomotion;
    a sensor configured to measure a force in the leg length direction proximate a second end of the at least one leg; and
    a controller in communication with the sensor and the at least one leg motor, the controller configured to detect a difference between the measured force profile and a force profile representing interaction of the at least one leg with a flat rigid surface, and configured to control the leg motor to extend or retract the leg to alter the force profile at the second leg end to substantially match the force profile representing interaction of the at least one leg with a flat rigid surface.

2. The robot according to claim 1, wherein the at least one leg spring comprises a leaf spring.

3. The robot according to claim 1, wherein the at least one leg spring has a stiffness tuned to a desired natural frequency of the gait.

4. The robot according to claim 1, wherein the at least one leg spring has a first end pivotally mounted about the axis of the leg motor.

5. The robot according to claim 4, wherein the at least one leg spring has a second end pivotally mounted to the extendable leg.

6. The robot according to claim 1, wherein the controller is configured to control the at least one leg motor to extend or retract the at least one leg to alter the force profile at the second end of the leg such that the center of mass movement of the robot substantially matches the center of mass movement of the robot present upon interaction with a flat rigid surface.

7. The robot according to claim 1, wherein the at least one extendable leg comprises a four-bar linkage.

8. The robot according to claim 7, wherein the at least one leg spring comprises first and second leg springs and the at least one leg motor comprises first and second leg motors, and wherein the first leg spring is disposed in series with the first leg motor and a first member of the four-bar linkage and wherein the second leg spring is disposed in series with the second leg motor and a second member of the four-bar linkage.

9. The robot according to claim 1, wherein the sensor provides a measure of the angular displacement of the leg proximate the leg motor and the angular displacement of the leg spring proximate the leg motor.

10. The robot according to claim 9, wherein the controller is configured to determine the measured force profile from the angular displacements of the leg and first end of the leg spring.

11. The robot according to claim 1, comprising a compound epicyclic cable drive operably connected between the at least one leg motor and at least one leg spring to transmit energy from the leg motor to the leg spring to effect movement of the leg spring.

12. The robot according to claim 1, wherein the at least one motor comprises a plurality of motors.

13. The robot according to claim 1, wherein the controller is configured to detect a difference between the integral of the measured force profile and the integral of the force profile representing interaction of the at least one leg with a flat rigid surface.

14. A method for controlling the force profile in the leg of a robot during stance to compensate for an unexpected ground disturbance, comprising:
providing a robot having at least one extendable leg, at least one leg motor coupled to a first end of the extendable leg and operable to extend and retract the leg along a leg length direction, and at least one leg spring disposed in series with the at least one leg motor and at least one leg, the leg spring configured to store energy therein during a touchdown part of a stance and configured to recover the stored energy during a liftoff part of the stance to provide passive dynamic locomotion;
measuring a force in the leg length direction proximate a second end of the at least one leg; and
detecting a difference between the measured force profile and a force profile representing interaction of the at least one leg with a flat rigid surface;
providing a controller in communication with at least one leg motor; and
commanding, with the controller, the leg motor to extend or retract the leg to alter the force profile at the second leg and to substantially match the force profile representing interaction of the at least one leg with a flat rigid surface.

15. The method according to claim 14, wherein the at least one leg spring comprises a leaf spring.

16. The method according to claim 14, wherein the at least one leg spring has a stiffness tuned to a desired natural frequency of the gait.

17. The method according to claim 14, wherein the at least one leg spring has a first end pivotally mounted about the axis of the leg motor.

18. The method according to claim 17, wherein the at least one leg spring has a second end pivotally mounted to the extendable leg.

19. The method according to claim 14, comprising extending or retracting the at least one leg to alter the force profile at the second end of the leg such that the center of mass movement of the robot substantially matches the center of mass movement of the robot present upon interaction with a flat rigid surface.

20. The method according to claim 14, wherein the at least one extendable leg comprises a four-bar linkage.

21. The method according to claim 20, wherein the at least one leg spring comprises first and second leg springs and the at least one leg motor comprises first and second leg motors, and wherein the first leg spring is disposed in series with the first leg motor and a first member of the four-bar linkage and wherein the second leg spring is disposed in series with the second leg motor and a second member of the four-bar linkage.

22. The method according to claim 14, wherein the step of measuring a force comprises measuring the angular displacement of the leg proximate the leg motor and the angular displacement of the leg spring proximate the leg motor.

23. The method according to claim 14, wherein the at least one motor comprises a plurality of motors.

* * * * *